United States Patent
Hutchison et al.

(10) Patent No.: US 11,212,671 B2
(45) Date of Patent: Dec. 28, 2021

(54) METHOD AND SYSTEM FOR SECURING COMMUNICATION LINKS USING ENHANCED AUTHENTICATION

(71) Applicant: SYNAPTICS INCORPORATED, San Jose, CA (US)

(72) Inventors: Guy Hutchison, San Jose, CA (US); Kamal Dalmia, Fremont, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 353 days.

(21) Appl. No.: 16/514,802

(22) Filed: Jul. 17, 2019

(65) Prior Publication Data
US 2020/0045540 A1    Feb. 6, 2020

Related U.S. Application Data

(60) Provisional application No. 62/713,054, filed on Aug. 1, 2018.

(51) Int. Cl.
| | | |
|---|---|---|
| *H04W 12/041* | (2021.01) | |
| *H04L 9/06* | (2006.01) | |
| *H04L 9/08* | (2006.01) | |
| *H04L 29/06* | (2006.01) | |
| *H04W 12/06* | (2021.01) | |
| *H04L 9/32* | (2006.01) | |

(52) U.S. Cl.
CPC ......... *H04W 12/041* (2021.01); *H04L 9/0631* (2013.01); *H04L 9/0841* (2013.01); *H04L 9/0869* (2013.01); *H04L 9/3236* (2013.01); *H04L 63/0435* (2013.01); *H04L 63/0442* (2013.01); *H04W 12/06* (2013.01)

(58) Field of Classification Search
CPC . H04W 12/041; H04W 12/06; H04W 12/069; H04W 4/38; H04L 9/0631; H04L 9/0869; H04L 63/0435; H04L 9/0841; H04L 63/0442; H04L 9/3236; H04L 63/101; H04L 9/3228; H04L 9/0844
See application file for complete search history.

(56) References Cited

U.S. PATENT DOCUMENTS

| | | | | |
|---|---|---|---|---|
| 11,125,567 | B2 * | 9/2021 | Kim | G01S 7/412 |
| 11,130,477 | B2 * | 9/2021 | Watts | B21D 1/06 |
| 2019/0039569 | A1 * | 2/2019 | Reed | H04L 63/0807 |
| 2020/0045540 | A1 * | 2/2020 | Hutchison | H04L 9/0869 |
| 2020/0055515 | A1 * | 2/2020 | Herman | B60W 30/09 |

* cited by examiner

*Primary Examiner* — Matthew Smithers
*Assistant Examiner* — Mirza Israr Javed
(74) *Attorney, Agent, or Firm* — Paradice & Li LLP

(57) ABSTRACT

A method and system for securing CSI and DSI links using enhanced authentication and cloud tracking are disclosed. According to one embodiment, a method comprises receiving at the receiving device an encrypted information signal from the transmitting device. The encrypted information signal includes a unique identifier of the transmitting device. The method further comprises testing whether a whitelist at the receiving device includes the unique identifier of the transmitting device. The encrypted information signal is decrypted producing a retrieved information signal only if the whitelist includes the unique identifier of the transmitting device; and otherwise terminating communication with the transmitting device.

42 Claims, 6 Drawing Sheets

METHOD AND SYSTEM FOR SECURING COMMUNICATION LINKS USING ENHANCED AUTHENTICATION

CROSS-REFERENCE TO RELATED APPLICATIONS

This application claims priority to and the benefit of U.S. Provisional Patent Application No. 62/713,054, entitled "Method and System for Securing CSI And DSI Links using Enhanced Authentication and Cloud Tracking," and filed on Aug. 1, 2018, the entire contents of which are incorporated herein by reference.

FIELD

This disclosure generally relates to communication systems and, in particular, to techniques to facilitate secured communication between trusted transmitting and receiving devices.

BACKGROUND

Modern vehicles and autonomous vehicles (AV) rely on a variety of hardware sensors connected to central processing units (CPUs) and/or graphics processing units (GPUs) to implement various control and/or Artificial Intelligence (AI) systems that may be used to assist a driver, or to drive the vehicle without human intervention. Such sensors are typically connected to the processors using high-speed wired communication links. These communication links are vulnerable to security issues such as wire-tapping. Wire-tapping of such links can be used to remotely monitor the sensor signals and to inject malicious signals into the stream to be received by the processor. Malicious data can also be used to program the sensors incorrectly which can cause accidents when driving the vehicle. Additionally, malicious data may be displayed on a driver console display, which can cause driver error. Currently, Mobile Industry Processor Interface (MIPI) Camera Serial Interface-2 (CSI-2) is a widely used connectivity protocol for sensor connectivity in modern vehicles and AVs. CSI-2 data is generally carried over coaxial or twisted-pair wiring using Serializer and Deserializer (SerDes) typically included in physical layer PHY devices that include a transmitter and/or a receiver. Such links can easily be tapped into by malicious agents. Other high-speed links that may be used in a vehicle include PCIe, USB, HDMI, Thunderbolt and Ethernet. Hackers can tap into these types of links as well. Examples of sensors used in modern vehicles and/or AVs include cameras, LIDAR, RADAR, GPS, etc.

Video and audio data may be communicated using a High-bandwidth Digital Content Protection (HDCP) system designed to protect the content. An HDCP system typically includes HDCP transmitter, optionally one or more HDCP Repeaters, and one or more HDCP receivers. These components are generally connected through their HDCP-protected interfaces in a tree topology. In a typical configuration, the HDCP transmitter is an upstream HDCP device that receives the HDCP content from a content/control module or device that is farther upstream. All HDCP devices connected to other HDCP devices in an HDCP system over HDCP protected interfaces are part of the HDCP system.

The content protected by HDCP, referred to as HDCP content, flows from the upstream content/control module or device into the HDCP system at the most upstream HDCP transmitter. From there the HDCP content, encrypted by the HDCP system, flows through a tree-shaped topology of HDCP receivers over HDCP protected interfaces. Many implementations of HDCP provide a content protection mechanism for: (1) authentication of HDCP receivers to their immediate upstream connection (e.g., an HDCP transmitter), (2) revocation of HDCP receivers that are determined to be invalid, and (3) HDCP encryption of audiovisual content over the HDCP protected interfaces between HDCP transmitters and their downstream HDCP receivers. HDCP receivers may render the HDCP content in audio and visual form for human or machine consumption.

In general, the HDCP content protection system has three elements, each playing a specific role in the system. First, an authentication protocol is provided using an HDCP transmitter that can verify that a given HDCP receiver is licensed/authorized to receive HDCP content. With the legitimacy of the HDCP receiver determined, encrypted HDCP content may be transmitted between the two devices based on shared secrets established during the authentication protocol. This generally prevents eavesdropping devices from utilizing the content. Finally, in the event that legitimate devices are compromised to permit unauthorized use of HDCP content, a renewability feature allows a HDCP transmitter to identify such compromised devices and prevent the transmission of HDCP content to the compromised devices.

A conventional HDCP, however, is vulnerable to security issues. Only Receivers are tracked for revocation. In the case of camera-to-processor or sensor-to-processor communication, a malicious camera, sensor or transmitter sending unauthorized data to the processor is generally not identified with HDCP. Typical implementations of HDCP do not provide any mechanism to track Transmitters for revocation. HDCP's receiver revocation list is stored locally and often programmed only once when the transmitter device is shipped from the factory. This makes the list stale as soon as it is shipped and may remain stale unless renewed. Because all protocol compliant transmitter devices can generally connect to all receivers except for the receivers on a revocation list, the system may be compromised by a malicious receiver not on the revocation list, or by a malicious transmitter.

SUMMARY

A method and system for securing CSI and DSI links using enhanced authentication and cloud tracking are disclosed. According to one embodiment, a method comprises receiving at the receiving device an encrypted information signal from the transmitting device. The information signal includes a unique identifier of the transmitting device. The method further comprises testing whether a whitelist at the receiving device includes the unique identifier of the transmitting device. The encrypted information signal is decrypted producing a retrieved information signal only if the whitelist includes the unique identifier of the transmitting device; and otherwise terminating communication with the transmitting device.

The above and other preferred features, including various novel details of implementation and combination of elements, will now be more particularly described with reference to the accompanying drawings and pointed out in the claims. It will be understood that the particular methods and apparatuses are shown by way of illustration only and not as limitations. As will be understood by those skilled in the art, the principles and features explained herein may be employed in various and numerous embodiments.

BRIEF DESCRIPTION OF THE DRAWINGS

The present invention will become more apparent in view of the attached drawings and accompanying detailed description. The embodiments depicted therein are provided by way of example, not by way of limitation, wherein like reference numerals/labels generally refer to the same or similar elements. In different drawings, the same or similar elements may be referenced using different reference numerals/labels, however. The drawings are not necessarily to scale, emphasis instead being placed upon illustrating aspects of the invention. In the drawings.

Figure 1:
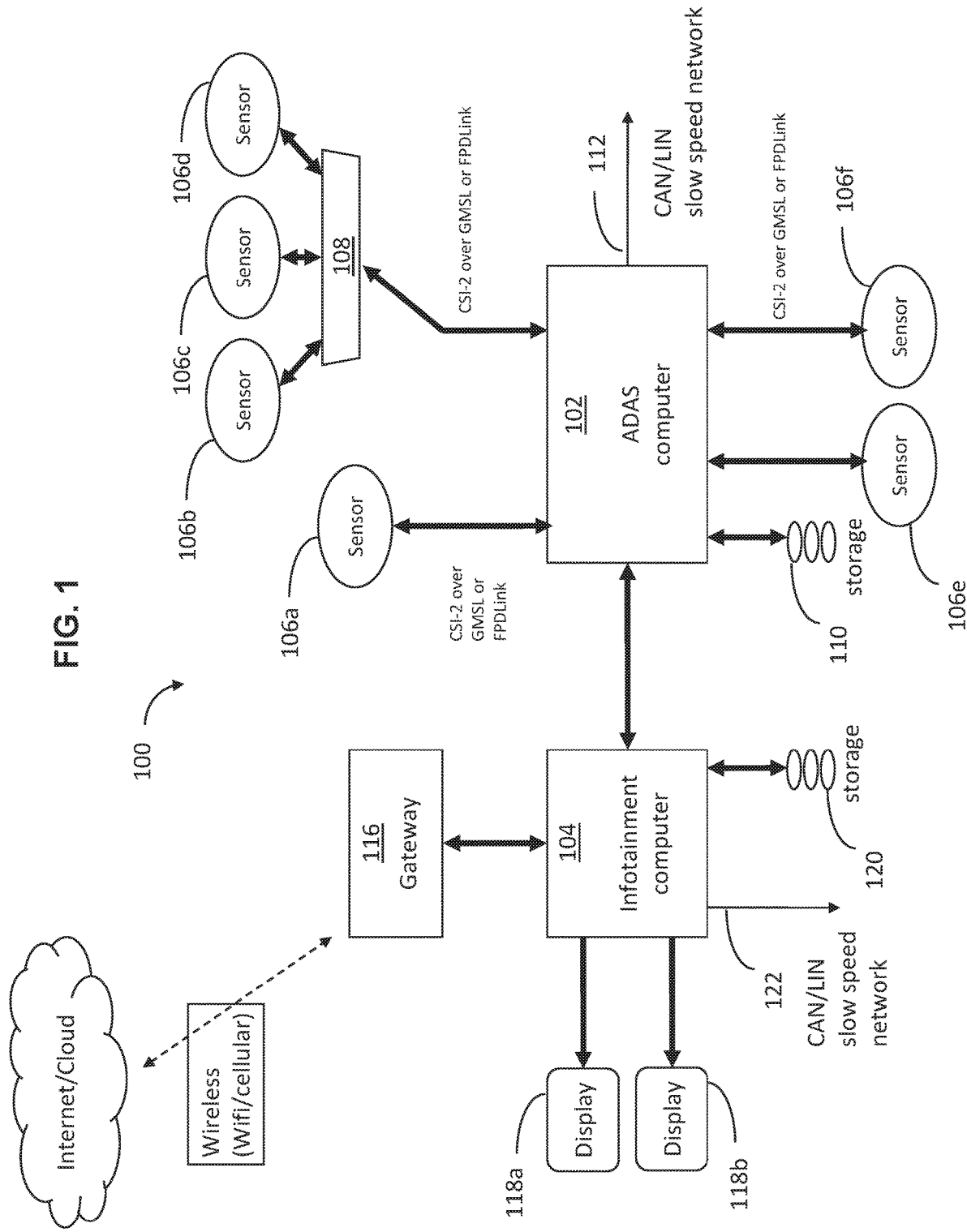
FIG. 1 schematically depicts a typical communication system used in vehicles.

While the present disclosure is subject to various modifications and alternative forms, specific embodiments thereof have been shown by way of example in the drawings and will herein be described in detail. The present disclosure should be understood to not be limited to the particular forms disclosed, but on the contrary, the intention is to cover all modifications, equivalents, and alternatives falling within the spirit and scope of the present disclosure.

DETAILED DESCRIPTION

A method and system for securing CSI and DSI links using enhanced authentication and cloud tracking are disclosed. According to one embodiment, a method comprises receiving at the receiving device an encrypted information signal from the transmitting device. The encrypted information signal includes a unique identifier of the transmitting device. The method further comprises testing whether a whitelist at the receiving device includes the unique identifier of the transmitting device. The encrypted information signal is decrypted producing a retrieved information signal only if the whitelist includes the unique identifier of the transmitting device; and otherwise terminating communication with the transmitting device.

A transmitting device may also include a whitelist, so that data may be transmitted only to trusted receiving devices. Moreover, the data exchanged between the transmitting and receiving devices may be encrypted using asymmetric keys so that there is no need for the transmitting and receiving devices to share a secret.

The following disclosure provides different embodiments, or examples, for implementing different features of the subject matter. Specific examples of components and arrangements are described below to simplify the present disclosure. These are, of course, merely examples and are not intended to be limiting.

With reference to FIG. 1, a high-speed in-vehicle network and internet connectivity system 100 includes an advanced driver assistance system (ADAS) computer 102 and an infotainment computer 104 that can communicate with each other. The ADAS computer 102 receives data from several sensors 106a-106f, such as cameras, lidars, inertial motion sensors, etc. The ADAS computer 102 may communicate with each of the sensors, e.g., to receive sensor data and/or to send signal(s) to control the operation of a sensor. A sensor (e.g., sensors 106a, 106e, 106f) may be connected to the ADAS computer 102 directly, e.g., using a camera serial interface 2 (CSI-2) link over a high speed serial link such as Gigabit Multimedia Serial Link (GMSL) and Flat Panel Display Link (FPDLink).

The sensor data from two or more sensors may be multiplexed via a multiplexer, and the ADAS computer 102 may communicate with such sensors indirectly, via the multiplexer. In the system 100, the sensors 106b-106d communicate with the ADAS computer 102 via a multiplexer 108. The multiplexer 108 is coupled to the ADAS computer directly, e.g., using a CSI-2) link over a high speed serial link such as Gigabit Multimedia Serial Link (GMSL) and Flat Panel Display Link (FPDLink).

The ADAS computer 102 also communicates with a non-volatile, storage system 110 (e.g., a disk drive, flash memory, solid-state storage, etc.), where the raw and/or processed sensor data, and/or the results of the sensor data analysis may be stored. To process and/or analyze the sensor data the ADAS computer 102 may include one or more central processing units (CPUs), one or more graphics processing units (GPUs), and/or one or more micro processing units (MPUs). The ADAS computer 102 also includes a slow speed Controller Area Network (CAN)/Local Interconnect Network (LIN) interface 112.

An infotainment computer 104 may communicate with a network gateway 116, and may access textual and/or audio/visual information from remote sources via a wireless network, cellular network, and/or the Internet. The received information may be displayed on one or more displays 118a, 118b. The infotainment computer 104 can process the received signals, e.g., using one or more CPUs, one or more GPUs, and/or one or more MPUs included in the infotainment system 104. The raw or processed data and/or the results of the processing may be stored using a storage device 120. The infotainment computer 104 may also receive processed sensor data and/or results of analysis of sensor data from the ADAS computer 102. Such data may also be displayed on the displays 118a, 118b. The infotainment computer 104 may also include a CAN/LIN interface 122.

Figure 2A:
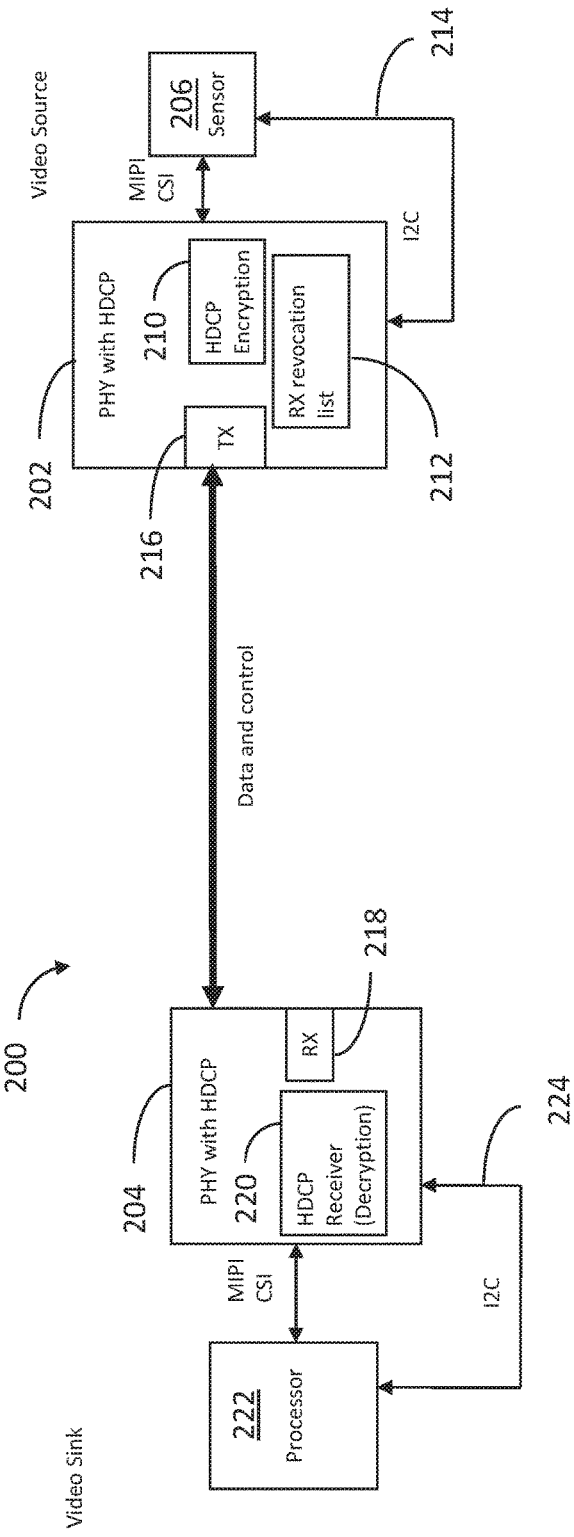
FIGS. 2A and 2B schematically depict typical communication systems based on the HDCP standard.

The operation of an exemplary system is described herein. With reference to FIG. 2A, in a communication system 200 a source PHY device 202 exchanges data and/or control signals with a sink PHY device 204. At the source (e.g., a video source), a sensor 206 (e.g., a camera, LiDAR, radar, etc.) communicates with the source PHY device 202 using a Camera Serial Interface (CSI) link 208 as defined by the Mobile Industry Processor Interface (MIPI), or a parallel bus interface (PBI) (not shown). The PHY device 202 implements encryption in the encryption module 210 that encrypts the data received from the sensor 206. The PHY device 202 includes an optional I2C link/interface 214 to over which data regarding the revocation list 212 can be communicated to the PHY device 202. The I2C link/interface 214 may also be used to communicate with the sensor 206. The PHY device 202 also includes a transmitter 216 that transmits the encrypted data to an intended receiver.

In the system 200, the source PHY 202 (e.g., a video source) communicates with the sink PHY 204 (e.g., a video sink), which includes a receiver 218 that receives encrypted data from the transmitter 216 of the source PHY device 202. A decryption module 220 decrypts the received data and can regenerate the original data, e.g., data collected by the sensor 206. The sink PHY 204 also communicates with a processor 222 using the MIPI CSI, where the processor 222 can receive the decrypted sensor data for processing and analysis thereof. The processor 222 may communicate with the sink PHY 204 using an I2C link, 224.

Figure 2B:
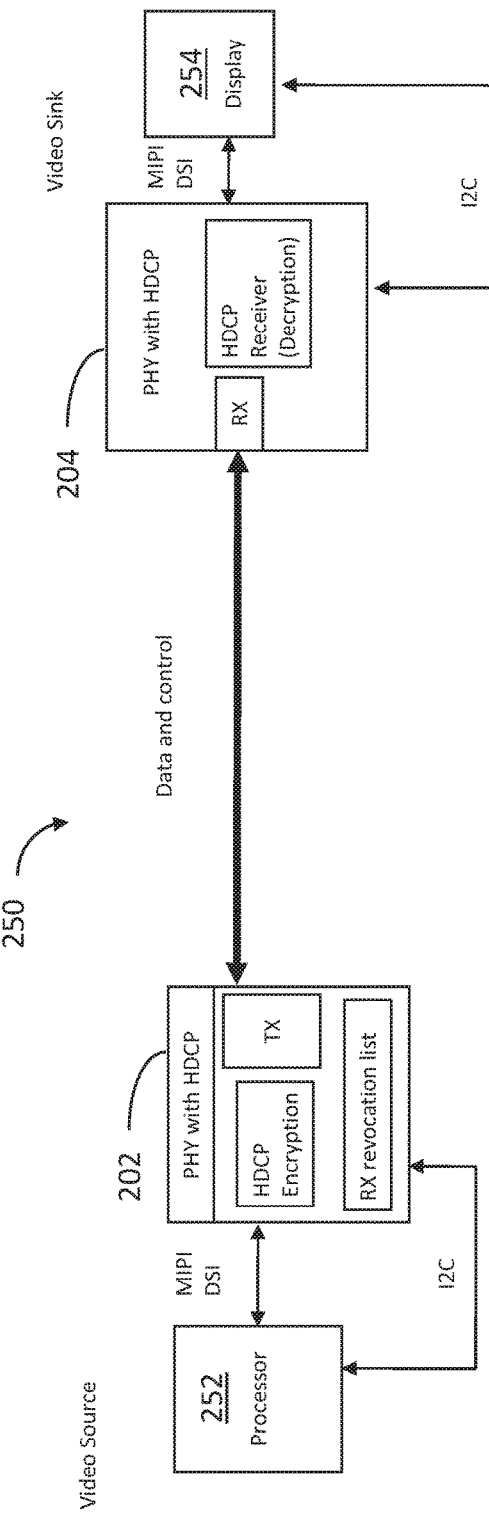

With reference to FIG. 2B, in a communication system 250 the source PHY device 202 exchanges data and/or control signals with a sink PHY device 204. In system 250, the source PHY device 202 does not always receive data from a sensor. Rather, the source PHY device 202 receives data (e.g., video frames) from a processor 252, via a communication link that uses MIPI Display Serial Interface (DSI). An I2C link may also be provided for communication between the processor 252 and the source PHY device 202.

As in the system 200, the source PHY device 202 encrypts the received data and transmits it to the sink PHY device 204, which is configured to communicate with a display 254 via an MIPI DSI link or a PBI link. The sink PHY device 204 can decrypt the received data (e.g., video frames), which may then be displayed by the display 254. The sink PHY device 204 can also communicate with the display 254 using an I2C link.

In various embodiments described herein, a whitelist is included in a receiving device, where the whitelist identifies certain trusted transmitter device(s). Data received from a transmitter device that is not on the whitelist is generally rejected. As such, the received communication can generally be considered as authentic. The robustness of the communication can be enhanced further, e.g., the communication may be made more secure, using an asymmetric encryption key pair.

Figure 3:
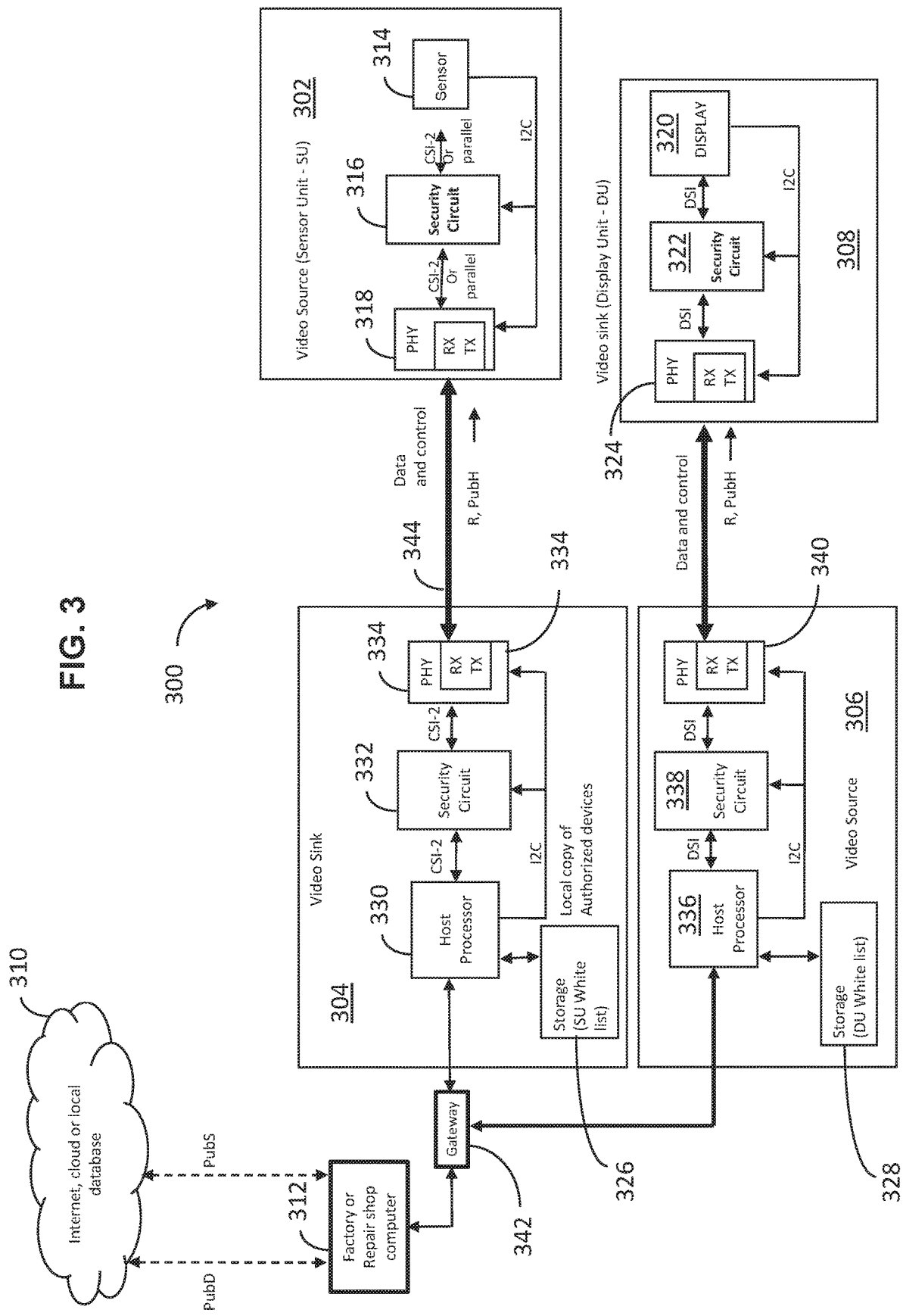
FIG. 3 schematically depicts a communication system employing enhanced authentication, according to one embodiment.

With reference to FIG. 3, an exemplary system 300 features enhanced authentication secured communication via CSI and DSI links between a sensor unit (SU) 302 and a sink device 304, and between a secure device 306 and display unit (DU) 308 according to one embodiment. At the time of manufacturing, the sensor unit (SU) 302 is assigned a unique identifier (ID-S) such as, e.g., a universally unique identifier (UUID). A public key/private key pair, denoted (PubS, PrvS), is generated for (or on) the SU 302. The ID-S and the private key (PrvS) are stored on the sensor unit 302 in non-volatile storage (not shown). In addition, the ID-S and the public key (PubS) are uploaded to a network connected database 310 that can be a private or a public database. Such database can also be based on blockchain technology and would therefore be distributed across several interconnected computers.

The display unit (DU) 308 is also assigned its own unique ID (denoted ID-D), e.g., its own UDID, and a public key/private key pair, denoted (PubD, PrvD), is generated for the DU 308. The ID-D and the private key (PrvD) may be stored on the DU 308 in non-volatile storage, and the ID-D and the public key (PubD) are uploaded to the database 310.

In some embodiments, the system 300 is installed in a vehicle. The initial programming of the system 300 and/or subsequent security processing may be performed using a computer 312 at an external facility such as, e.g., a factory where the vehicle or the system 300 were manufactured, an authorized dealer of the vehicle, or a repair shop. It is assumed that the external facility has access to the internet, cloud (private or public), or a local database to access the sensor public key (PubS) and the display public key (PubD).

The sensor unit (SU) 302 includes a sensor 314, security circuitry 316 that can process the ID-S and sensor unit private key (PrvS), and a PHY transmitter/receiver 318. The display unit (DU) 308 includes a display 320, security circuitry 322 that can process the ID-D and display unit private key (PrvD), and a PHY transmitter/receiver 324. The sink device 304 includes a storage device 326 for storing a sensor unit white list and the source device 306 includes a storage device 328 for storing a display unit whitelist. The whitelist identifies authorized devices and may be installed when the vehicle in which the system 300 is installed is manufactured or serviced.

The sink device 304 includes a host processor (HP_S) having secure non-volatile storage. This storage can be the same as the storage 326 or a different storage. The sink device 304 also includes security circuitry 332 and PHY transmitter/receiver 334. The source device 306 similarly includes another host processor HP-D 336, having secure non-volatile storage that can be the same as the storage 328 or a different storage, secure circuitry 328, and PHY transmitter/receiver 340. In some embodiments, the sink device 304 and the source device 306 are not two separate devices. A single device, e.g., the sink device 304 or the source device 306 performs the functions of both devices. The host processors 330, 336 communicate with the computer 312 of the external facility via a gateway 342.

Figure 4:
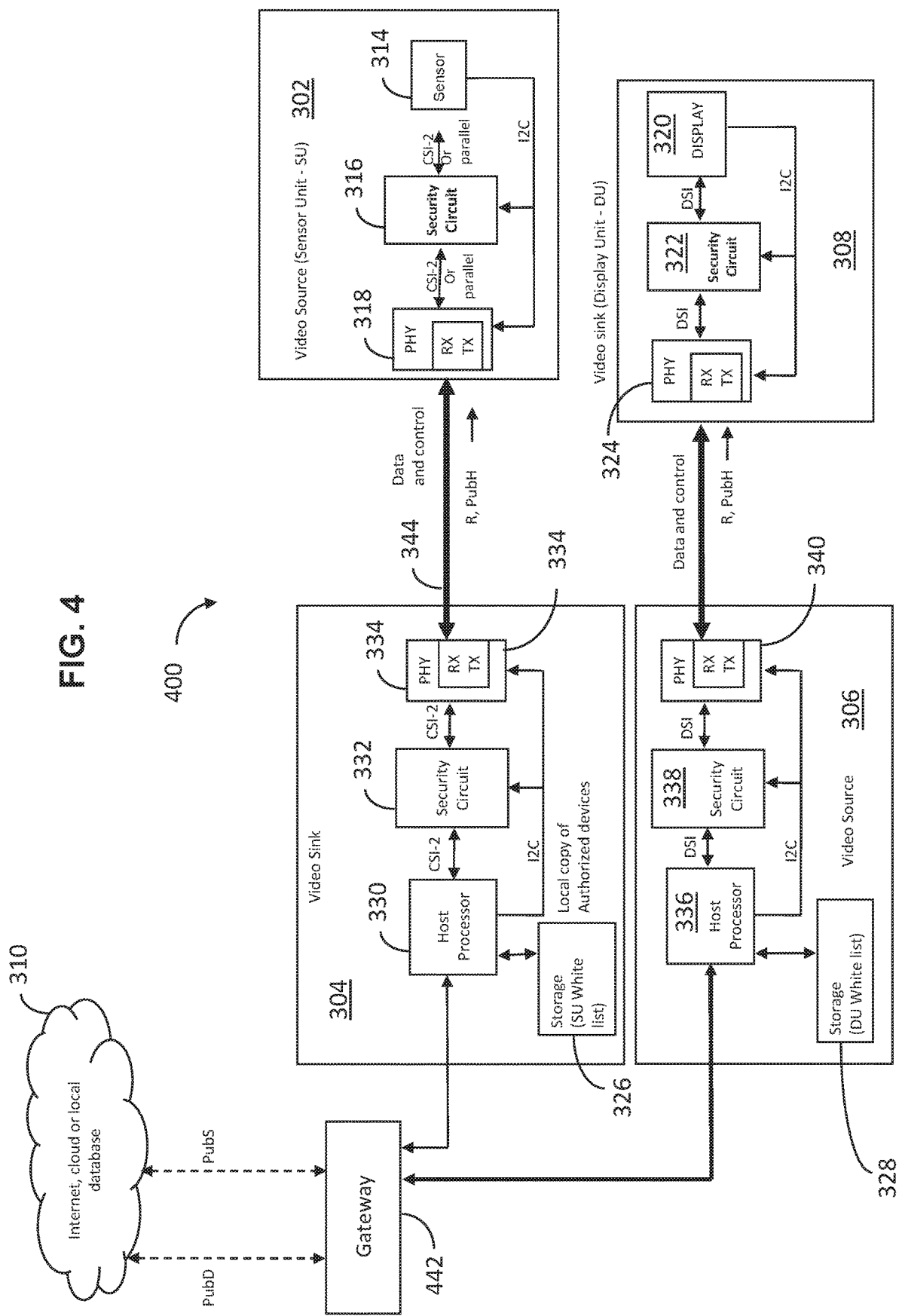
FIG. 4 schematically depicts a communication system that employs enhanced authentication and that can be operated from a vehicle on the road, according to one embodiment.

With reference to FIG. 4, the system 400 is similar to the system 300 (FIG. 3). In the system 400, the gateway 442 is configured to communicate directly with the database 310. As such, various identifiers and keys may be generated and stored in the database 310, similarly as described in connection with the system 300 (FIG. 3), but when the vehicle in which the system 400 is installed is on the road.

With reference to FIGS. 3 and 4, in operation according to one embodiment, the security circuitry 316 of the sensor unit (e.g., source device) 302 receives sensor data from the sensor 314, and encrypts the received data. The encryption technique can be a symmetric key based technique such as streaming cipher or a block cipher technique such as Advanced Encryption Standard Galois/Counter Mode (AES-GCM). The encryption technique can also be based on asymmetric keys. The PHY transmitter/receiver 318 receives the encrypted information signal (including control, status, a unique identifier, and data) and transmits it to the sink device 304. One or more frames of the transmitted encrypted information signal identify the sensor unit 302 by its identifier (ID-S). According to one embodiment, the identifier (ID-S) is not encrypted and transmitted in the clear, even though the transmitted data is encrypted. According to another embodiment, the identifier (ID-S) is encrypted along with the rest of the data, control and status information.

The sink device 304 accesses the whitelist stored on the storage device 326 and tests whether the received ID (ID-S) is included in the whitelist. In some embodiments, only if the identifier of the sending device (e.g., ID-S of the source device 302 in this example) is included in the whitelist, the transmitter/receiver 334 of the sink device 304 accepts the data frames from the source device 302. Otherwise, the arriving data frames may be rejected, and the receiving device may characterize the sending device as unauthorized or malicious. In this manner, the likelihood of receiving fake and potentially harmful data from an unauthorized sending device is minimized.

In one embodiment, the source device 306 may receive encrypted information signals from the sink device 308, with each signal including control, status, a unique identifier, and data. The encrypted information signal may be completely encrypted, or a only a portion of the signal may be encrypted. For example, the encrypted information signals may include user data that is encrypted. The encrypted information signals may also include a unique identifier that is not encrypted (although in alternate embodiments the unique identifier may also be encrypted). The source device may access the whitelist stored on the storage 328 and receive or accept the incoming communication from the sink device 308 only if the identifier ID-D of the sink device 308 is identified in the received data/information and that identifier is included in the whitelist. Otherwise, communication from and/or to the sink device 308 may be terminated. The source device 306 may also use the whitelist to determine whether to send any data or information to the sink device 308. In this case, the source device 306 may transmit information, which may include data and/or control information, to the sink device 308 only if the identifier ID-D of the sink device 308 is included in the whitelist accessed from the storage 328.

Figure 5:
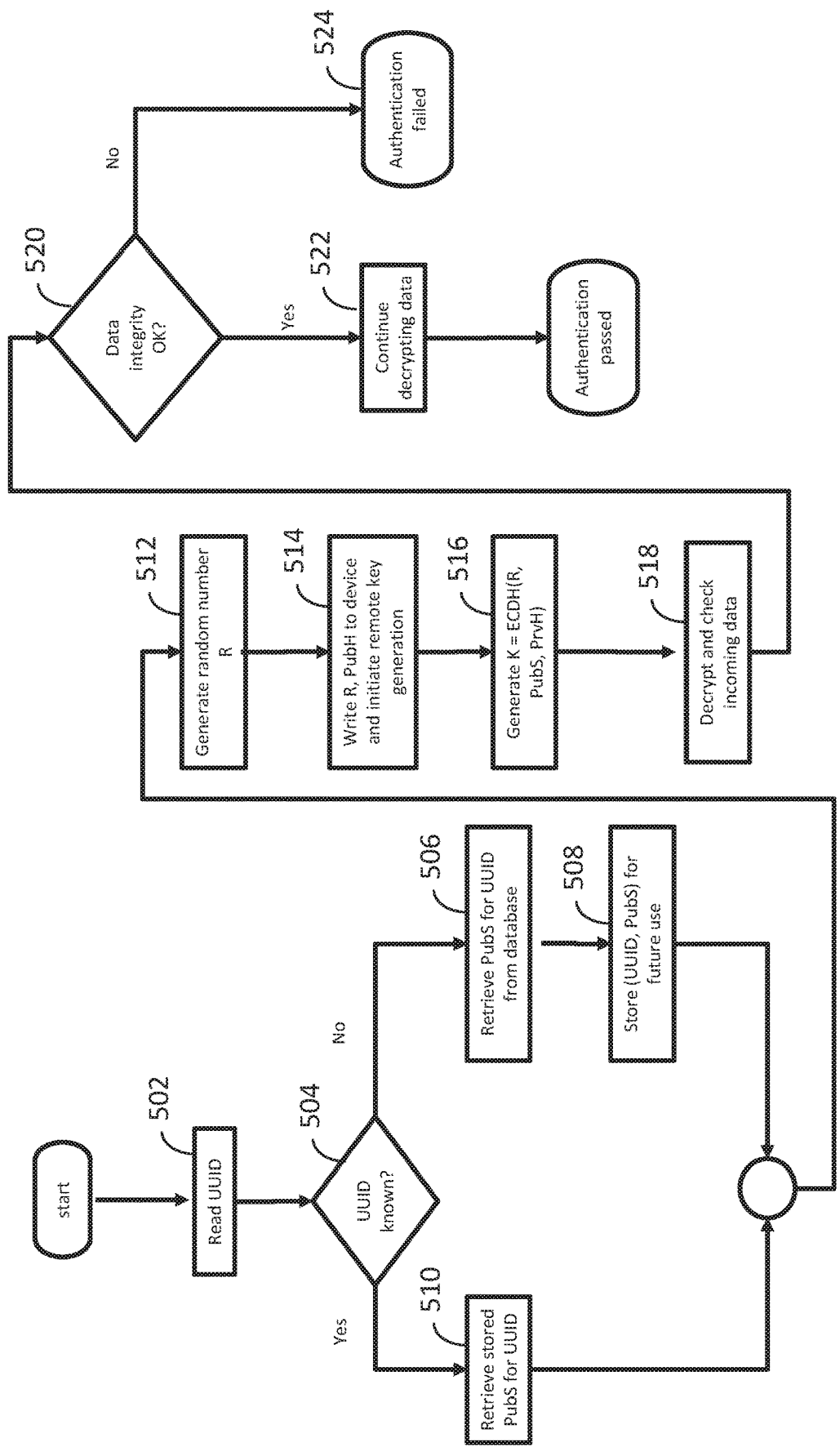
FIG. 5 is a flow chart illustrating a process by which a receiving device can receive data from a sensor, according to one embodiment.

FIG. 5 shows another exemplary process flow 500 for device initialization according to one embodiment that employs encryption/decryption using asymmetric keys with the components of the systems 300 or 400 (FIGS. 3 and 4). The host processor HP-S 330 of the sink device 304 reads the ID-S from the sensor-unit 302 using I2C or in-band communication over the PHY link 344 (step 502). If the ID-S is unknown to HP-S 330 (step 504), it retrieves public key (PubS) for SU 302 from the database 310 (step 506), and stores the ID-S, PubS pair in the local storage (step 508). Otherwise, the HP-S 330 retrieves the PubS from the local storage (step 510). The security circuitry 332 uses a random number generator to generate a random number R and private key pair (PubH, PrvH) (step 512). The host processor writes R and PubH to the SU 302 using I2C command sent to SU 302 via the PHY link 344 (step 514). The security circuitry 332 also creates the session key K using sensor unit public key, host private key, and the random number R e.g., using an encryption technique such as Elliptic Curve Diffie-Hellman (ECDH) or another encryption technique as follows (step 516):

E(R, PubS, PrvH)→K

The sensor unit security circuitry 316 computes the same session key K using the host public key and the sensor private key:

E(R, PubH, PrvS)→K

The security circuitry 316 of the SU 302 encrypts each frame to be transmitted with a session key K that the circuitry 316 generated. The security circuitry 332 of the sink device 304 decrypts the received encrypted data frames with session key K that the security circuitry 332 generated (step 518). The sensor unit 302 is implicitly authenticated as a specific sensor. Having the right private key PrvS allows sensor unit 302 to generate a session key K from R, and PubH.

Specifically, an incoming frame of data received at a sink device 304 includes a cryptographic hash of the information contained in the data frame. The hash is dependent on the session key that was used to encrypt the data frame. After decrypting the received encrypted data frame, the security circuitry 332 of the sink device 304 computes a hash of the retrieved information using the session key that it generated, and compares the hash it computed with the hash received in the data frame (step 520).

The same session key would be generated only if the transmitting device is authentic and, as such, the receiving device obtained the right public key for the transmitting device in steps 506 or 510. Otherwise, the respective session keys generated by the receiving and transmitting devices would not be the same. Only if the two session keys are identical, the hash of the transmitted information that was computed by the security circuitry 316 of the source device 302 would be the same as the hash of the retrieved information that was computed by the security circuitry 332 of the sink device 304. If the two hashes match, the sink device 304 may continue with decrypting additional data frames received from the source device 302 (step 522). Otherwise, the sink device 304 determines that the authentication failed (step 524). The sink device 304 may conclude that the source device 302 is not authentic and may be malicious or compromised, and may terminate further communication therewith.

Figure 6:
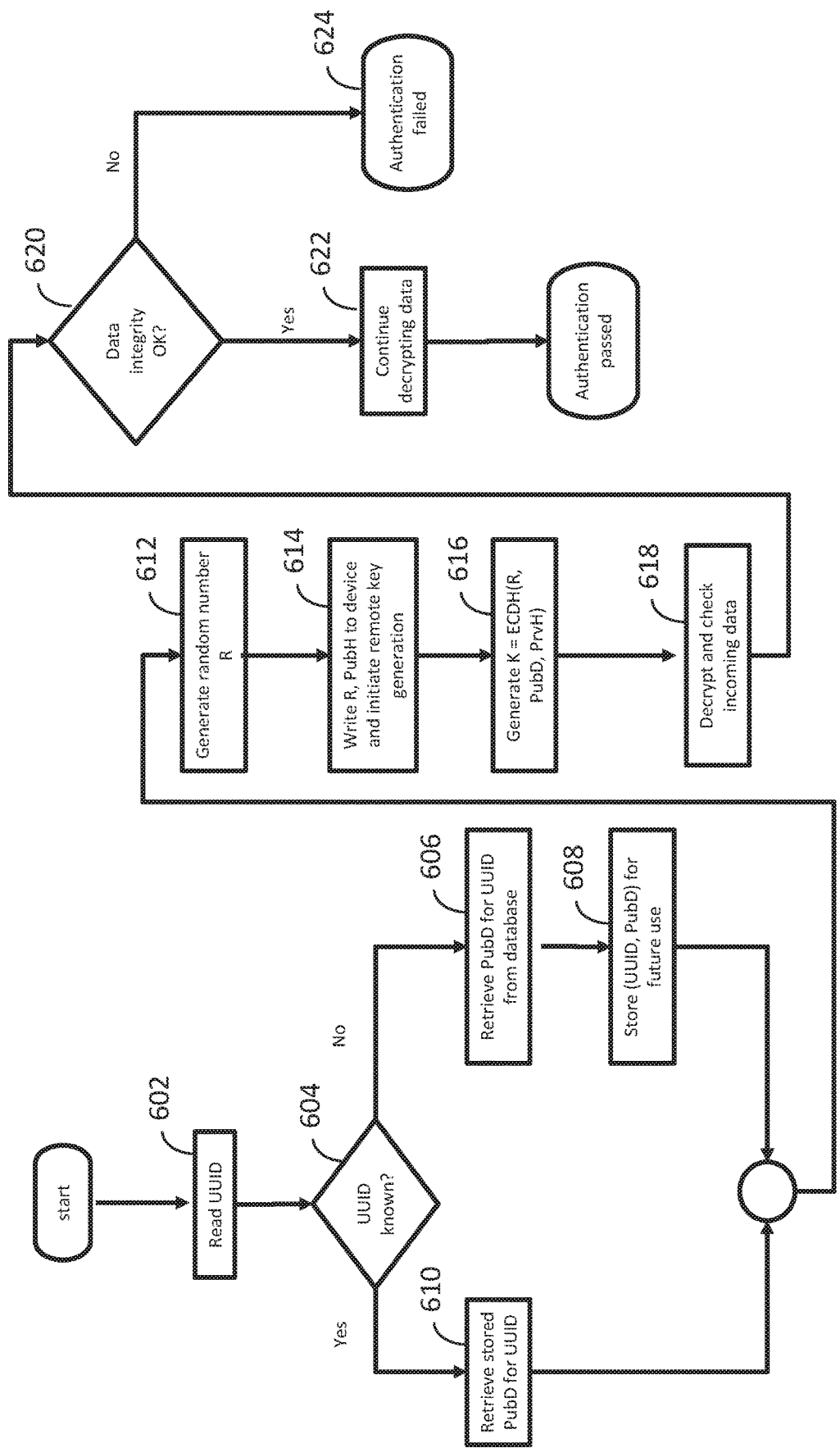
FIG. 6 is a flow chart illustrating a process by which a device can communicate with a display system, according to one embodiment.

FIG. 6 shows an exemplary device initialization process 600 for a display unit, according to one embodiment that includes similar steps as the corresponding steps of the process 500 (FIG. 5). In this case, the operations of the process 600 are performed at the source device 306. Instead of using the public key PubS of the sensor unit 306, the display unit 308 public key (PubD) is used by the host processor HP-D 336 in each of the steps 606, 608, 616. Also, in step 614, the host processor 336 writes the random number R and its own public key PubH to the display unit 308. The security circuitry 322 of the display unit 308 can generate the session key K using R, PubH, and its own private key PrvD. The security circuitry 338 of the source device 306 also generated the same session key K, but by using R, PubD, and the private key PrvH of its own host computer 336. In this case, the source device 306 may accept any data/control information from the display unit 308 only if decryption of the received encrypted data/control succeeds, as described below.

For the asymmetric key exchange described above, it should be understood that the authentication protocol described is not specific to Elliptic Curve Diffie-Hellman (ECDH). A different asymmetric protocol can be used in step 516 (FIG. 5) and step 616 (FIG. 6) to generate the session key K. Only the publicly viewable information (R and PubH) is communicated. The private keys of the SU 306 (PrvS) and of the DU 308 (PrvD) and the session key K are never exchanged in the clear or unencrypted form.

In some embodiments, the receiving devices do not use a whitelist, but employ encryption/decryption using asymmetric keys as described above. For both SU 306 and DU 308, security data can also be sent as in-line data as opposed to using an I2C channel. These embodiments provide implicit authentication using an implicit handshake. Specifically, an incoming frame data includes a header and a footer. The footer includes a cryptographic hash that is dependent on having a correct session key, which is generated only if the receiving device received during the set-up phase has the identifier of the transmitting device. Otherwise, a mismatch of the hash computed by the host processor and the hash included in a received data frame would occur, indicating failure of the decryption. In that event, the receiving system determines that the transmitting system is compromised. In some embodiments, a whitelist is used at a receiving device in addition to using the asymmetric key based encryption/decryption.

As described above, in other embodiments a whitelist is used by a sink device 308 to accept data from trusted source devices 306 only and a source device 306 may use a whitelist to send data only to trusted sink devices 308. In these embodiments, symmetric key based encryption may be used. For example, Advanced Encryption Standard Galois/Counter Mode (AES-GCM) is a mode of operation for symmetric key cryptographic block ciphers that is used in some embodiments. Per AES-GCM, blocks of data/information in a stream of data/information to be transmitted are numbered sequentially, and then the block number is combined with an initialization vector (IV), and encrypted with a block cipher E, such as, e.g., an AES cypher. The result of this encryption is then XORed with the plaintext to produce the ciphertext. A different IV is generally used for each stream that is encrypted.

In some embodiments, the ciphertext blocks are treated as coefficients of a polynomial which is then evaluated at a key-dependent point H, using finite field arithmetic. The result is then encrypted, producing an authentication tag that can be used to verify the integrity of the data. The encrypted text then contains the IV, ciphertext, and authentication tag. In some embodiments, streaming cipher is used to encrypt the data/information to be transmitted. In these embodiments, the source and the sink devices share their respective encryption keys to facilitate decryption but, due to the testing using a whitelist, the devices know that their communication partners are trusted devices, which allows them to share the encryption keys.

The advantages of various embodiments of the system and method described herein over conventional HDCP systems include:

- Encrypting all or selected frame traffic prevents snooping and altering of traffic between sensor unit and host processor.
- Authenticating the sensor can prevent man-in-the-middle attacks.
- Enhanced authentication can avoid the need for a complex authentication protocol.
- A microprocessor or operating system on the sensor is not needed to perform key management, which can reduce system cost and/or complexity.
- The public database is only accessed when new source device ID or display unit ID is received.
- A vehicle does not require continuous network connectivity.
- A change in sensor unit or display unit ID is a trackable security event.
- Some embodiments can provide notifications to a user if a sensor unit ID or display ID changes within the system.

The enhanced authentication may be implemented in chipsets (e.g., PHY application specific integrated circuits (ASICs)) or in software/firmware. In some embodiments, the enhanced authentication may also be implemented as an add-on to existing HDCP systems, e.g., HDCP 1.3 systems. The enhanced authentication occurs at the CSI-2 level, and is transparent to lower-level communication devices such as Gigabit Multimedia Serial Link (GMSL) and Flat Panel Display Link (FPDLink).

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated.

What is claimed is:

1. A method for secure communications between a display device of a vehicle and a sensor device of a vehicle, the method performed by the display device and comprising:
    receiving, from the sensor device, an encrypted information signal including a unique identifier of the sensor device and a number of encrypted data frames, wherein the encrypted information signal is derived from an unencrypted information signal generated by an information source associated with the sensor device;
    determining whether a whitelist stored at the display device includes the unique identifier of the sensor device;
    selectively decrypting, using an asymmetric key protocol, the encrypted information signal based on whether the whitelist includes the unique identifier of the sensor device;
    retrieving the encrypted data frames from the encrypted information signal responsive to the decrypting; and
    forwarding the encrypted data frames to one or more of a data-processing component or a display component of the display device.

2. The method of claim 1, wherein the encrypted information signal is one of a data signal or a control signal, and wherein the unique identifier is not encrypted.

3. The method of claim 1, wherein the information source is one or more of a sensor, a camera, a Light Detection and Ranging (LIDAR) process, or a Global Positioning System (GPS).

4. The method of claim 1, wherein the display device forwards the encrypted data frames via one or more of a Mobile Industry Processor Interface Display Serial Interface (MIPI-DSI) or a parallel bus interface (PBI).

5. The method of claim 1, wherein the whitelist is stored in a secured storage module of the display device during manufacture of the display device.

6. The method of claim 1, further comprising:
    receiving an update to the whitelist; and
    storing the whitelist or the whitelist incorporating the update in a secured storage module of the display device.

7. The method of claim 1, further comprising:
    authenticating the sensor device using the asymmetric key protocol.

8. The method of claim 7, wherein the asymmetric key protocol is an Elliptic Curve Diffie-Helman (ECDH) technique, wherein using the ECDH technique results in a shared symmetric key for the sensor device and the display device.

9. The method of claim 1, wherein selectively decrypting the encrypted information signal is based at least in part on a symmetric key protocol.

10. The method of claim 9, wherein the symmetric key protocol is based at least in part on a shared symmetric key.

11. The method of claim 9, wherein the symmetric key protocol is based at least in part on an Advanced Encryption Standard Galois/Counter Mode (AES-GCM) decryption technique or a stream cipher decryption technique.

12. A method for secure communications between a display device of a vehicle and a sensor device of a vehicle, the method performed by the display device and comprising:

receiving, from the sensor device, an encrypted information signal including a number of encrypted data frames, wherein the encrypted information signal is derived from an unencrypted information signal generated by an information source associated with the sensor device;

decrypting, using an asymmetric key protocol, the encrypted information signal using a session key based on a random number shared with the sensor device, a public key associated with the sensor device, and a private key associated with the display device;

selectively accepting the encrypted information signal from the sensor device based on whether the decryption is determined to be successful;

retrieving the encrypted data frames from the encrypted information signal responsive to the accepting; and forwarding the encrypted data frames to one or more of a data-processing component or a display component of the display device.

13. The method of claim 12, wherein:
the encrypted information signal includes a first hash value;
decrypting the encrypted information signal includes generating a second hash value; and
the determination that the decryption is successful is based on determining that the second hash value is the same as the first hash value.

14. The method of claim 12, further comprising:
receiving a unique identifier of the sensor device, wherein the unique identifier is not encrypted; and
accessing the public key from a local storage or a remote storage.

15. The method of claim 14, wherein accessing the public key includes accessing the remote storage via one or more of a wireless network, the Internet, or a private network.

16. The method of claim 14, wherein the remote storage includes a database including the public key or a blockchain public key associated with the sensor device.

17. The method of claim 14, further comprising:
generating the random number; and
generating the session key using the random number, the public key, and a private key associated with the display device.

18. The method of claim 12, further comprising:
generating the random number; and
transmitting, to the sensor device, the random number and the public key.

19. The method of claim 12, wherein the information source is one or more of a sensor, a camera, a Light Detection and Ranging (LIDAR) process, or a Global Positioning System (GPS).

20. The method of claim 12, wherein the unencrypted information signal is received via one or more of a Mobile Industry Processor Interface Camera Serial Interface (MIPI-CSI) or a parallel bus interface (PBI).

21. The method of claim 12, wherein the encrypted data frames are forwarded via one or more of a Mobile Industry Processor Interface Display Serial Interface (MIPI-DSI) or an Inter-Integrated Circuit ($I^2C$).

22. A system, comprising:
a display device;
a sensor device of a vehicle;
one or more central processing units; and
at least one memory coupled to the one or more central processing units and storing instructions that, when executed by the one or more central processing units, cause the system to perform operations including:

receiving, from the sensor device, an encrypted information signal including a unique identifier of the sensor device and a number of encrypted data frames, wherein the encrypted information signal is derived from an unencrypted information signal generated by an information source associated with the sensor device;

determining whether a whitelist stored at the display device includes the unique identifier of the sensor device;

selectively decrypting, using an asymmetric key protocol, the encrypted information signal based on whether the whitelist includes the unique identifier of the sensor device;

retrieving the encrypted data frames from the encrypted information signal responsive to the decrypting; and forwarding the encrypted data frames to the display device.

23. The system of claim 22, wherein the encrypted information signal is one of a data signal or a control signal, and wherein the unique identifier is not encrypted.

24. The system of claim 22, wherein the information source is one or more of a sensor, a camera, a Light Detection and Ranging (LIDAR) process, or a Global Positioning System (GPS).

25. The system of claim 22, wherein the display device forwards the encrypted data frames via one or more of a Mobile Industry Processor Interface Display Serial Interface (MIPI-DSI) or a parallel bus interface (PBI).

26. The system of claim 22, further comprising:
a secured storage module of the display device, wherein the whitelist is stored in the secured storage module during manufacture of the display device.

27. The system of claim 22, wherein execution of the instructions causes the system to perform operations further including:
receiving an update to the whitelist; and
storing the whitelist or the whitelist incorporating the update in a secured storage module of the display device.

28. The system of claim 22, wherein execution of the instructions causes the system to perform operations further including:
authenticating the sensor device using the asymmetric key protocol.

29. The system of claim 28, wherein the asymmetric key protocol is an Elliptic Curve Diffie-Helman (ECDH) technique, wherein using the ECDH technique results in a shared symmetric key for the sensor device and the display device.

30. The system of claim 22, wherein selectively decrypting the encrypted information signal is based at least in part on a symmetric key protocol.

31. The system of claim 30, wherein the symmetric key protocol is based at least in part on a shared symmetric key.

32. The system of claim 30, wherein the symmetric key protocol is based at least in part on an Advanced Encryption Standard Galois/Counter Mode (AES-GCM) decryption technique or a stream cipher decryption technique.

33. A system, comprising:
a display device;
a sensor device of a vehicle;
one or more central processing unist; and
at least one memory coupled to the one or more central processing units and storing instructions that, when executed by the one or more central processing units, cause the system to perform operations including:

receiving, from the sensor device, an encrypted information signal including a number of encrypted data frames, wherein the encrypted information signal is derived from an unencrypted information signal generated by an information source associated with the sensor device;

decrypting, using an asymmetric key protocol, the encrypted information signal using a session key based on a random number shared with the sensor device, a public key associated with the sensor device, and a private key associated with the display device;

selectively accepting the encrypted information signal from the sensor device based on whether the decryption is determined to be successful;

retrieving the encrypted data frames from the encrypted information signal responsive to the accepting; and forwarding the encrypted data frames to the display device.

34. The system of claim 33, wherein the encrypted information signal includes a first hash value.

35. The system of claim 34, wherein:
decrypting the encrypted information signal includes generating a second hash value; and
the determination that the decryption is successful is based on determining that the second hash value is the same as the first hash value.

36. The system of claim 33, wherein execution of the instructions causes the system to perform operations further including:

receiving a unique identifier of the sensor device at the display device, wherein the unique identifier is not encrypted; and
accessing the public key from a local storage or a remote storage.

37. The system of claim 36, wherein accessing the public key includes accessing the remote storage via one or more of a wireless network, the Internet, or a private network.

38. The system of claim 36, wherein the remote storage includes a database including the public key or a blockchain public key associated with the sensor device.

39. The system of claim 36, wherein execution of the instructions causes the system to perform operations further including:
generating the random number; and
generating the session key using the random number, the public key, and a private key associated with the display device.

40. The system of claim 33, wherein the information source is one or more of a sensor, a camera, a Light Detection and Ranging (LIDAR) process, or a Global Positioning System (GPS).

41. The system of claim 33, wherein the unencrypted information signal is received via one or more of a Mobile Industry Processor Interface Camera Serial Interface (MIPI-CSI) or a parallel bus interface (PBI).

42. The system of claim 33, wherein the encrypted data frames are forwarded via one or more of a Mobile Industry Processor Interface Display Serial Interface (MIPI-DSI) or an Inter-Integrated Circuit ($I^2C$).

* * * * *

UNITED STATES PATENT AND TRADEMARK OFFICE
CERTIFICATE OF CORRECTION

| | |
|---|---|
| PATENT NO. | : 11,212,671 B2 |
| APPLICATION NO. | : 16/514802 |
| DATED | : December 28, 2021 |
| INVENTOR(S) | : Guy Hutchison and Kamal Dalmia |

Page 1 of 1

It is certified that error appears in the above-identified patent and that said Letters Patent is hereby corrected as shown below:

In the Claims

In Column 12, Line 63, in Claim 33, delete "one or more central processing unist; and" and insert
-- one or more central processing units; and --

Signed and Sealed this
Eighth Day of February, 2022

Drew Hirshfeld
*Performing the Functions and Duties of the
Under Secretary of Commerce for Intellectual Property and
Director of the United States Patent and Trademark Office*